(12) United States Patent
Xu et al.

(10) Patent No.: US 11,542,570 B2
(45) Date of Patent: Jan. 3, 2023

(54) DEVICE AND A METHOD FOR REDUCING AND HOMOGENIZING RESIDUAL STRESS OF A WORKPIECE GENERATED DURING MACHINING

(71) Applicant: BEIJING INSTITUTE OF TECHNOLOGY, Beijing (CN)

(72) Inventors: Chunguang Xu, Beijing (CN); Dezhi Li, Beijing (CN); Yuren Lu, Beijing (CN); Ruili Jia, Beijing (CN); Peng Yin, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 379 days.

(21) Appl. No.: 16/878,892

(22) Filed: May 20, 2020

(65) Prior Publication Data
US 2020/0370143 A1    Nov. 26, 2020

(30) Foreign Application Priority Data
May 22, 2019   (CN) .......................... 201910431201.X

(51) Int. Cl.
*B06B 1/06*   (2006.01)
*B06B 3/00*   (2006.01)
*C21D 10/00*   (2006.01)

(52) U.S. Cl.
CPC ............ *C21D 10/00* (2013.01); *B06B 1/0622* (2013.01); *B06B 3/00* (2013.01); *B06B 2201/70* (2013.01)

(58) Field of Classification Search
CPC ....... C21D 10/00; B06B 3/00; B06B 2201/70; B06B 1/0622

USPC ............................................................ 72/56
See application file for complete search history.

(56) References Cited

U.S. PATENT DOCUMENTS

| | | | | |
|---|---|---|---|---|
| 3,880,028 A | * | 4/1975 | Frederick, Jr. .......... | C03B 33/10 83/522.25 |
| 4,709,198 A | * | 11/1987 | Ogo ................... | G05B 19/4065 318/39 |
| 4,834,209 A | * | 5/1989 | Vogel ....................... | G01V 1/46 367/32 |

(Continued)

FOREIGN PATENT DOCUMENTS

| | | |
|---|---|---|
| CN | 103769958 A | 5/2014 |
| CN | 103834794 A | 6/2014 |

(Continued)

*Primary Examiner* — Jacques M Saint Surin
(74) *Attorney, Agent, or Firm* — John A. Miller; Shumaker, Loop & Kendrick, LLP

(57) ABSTRACT

The present disclosure provides a device and a method for reducing and homogenizing residual stress during machining in which a workpiece is fixed, such as milling, boring, drilling and planning, with which high-energy acoustic waves are emitted to the workpiece via a tight contact between a plurality of high-energy wave exciters on a bench and a workpiece coated with a coupling medium, and residual stress inside the machined workpiece is reduced and homogenized through elastic wave energy generated in the workpiece by the high-energy acoustic waves. In this way, the purpose of reducing and homogenizing the residual stress while machining is achieved, realizing a stress-free machining, and the deformation of the workpiece during and after machining is minimized.

10 Claims, 4 Drawing Sheets

(56) References Cited

U.S. PATENT DOCUMENTS

| | | | | |
|---|---|---|---|---|
| 6,993,948 | B2* | 2/2006 | Offer | C21D 10/00 29/90.7 |
| 7,372,777 | B2* | 5/2008 | Hurst | B06B 1/0633 367/159 |
| 8,613,312 | B2* | 12/2013 | Zolezzi-Garreton | E21B 43/003 166/177.2 |
| 2007/0257083 | A1* | 11/2007 | Narasimalu | H01L 24/85 228/8 |
| 2022/0025500 | A1* | 1/2022 | Xu | C22F 3/00 |

FOREIGN PATENT DOCUMENTS

| | | |
|---|---|---|
| CN | 105014118 A | 11/2015 |
| CN | 107470995 A | 12/2017 |
| CN | 109516218 A | 3/2019 |
| CN | 109571111 A | 4/2019 |
| WO | 2014110864 A1 | 7/2014 |

\* cited by examiner

DEVICE AND A METHOD FOR REDUCING AND HOMOGENIZING RESIDUAL STRESS OF A WORKPIECE GENERATED DURING MACHINING

CROSS-REFERENCE TO RELATED APPLICATION

This application claims priority to Chinese Patent Application No. CN201910431201.X filed May 22, 2019, the entire disclosure of which is incorporated herein by reference.

BACKGROUND

Field

The invention relates to a field of machining technology, and in particular, to a device and a method for reducing and homogenizing residual stress during processing in which a workpiece is fixed, such as milling, boring, drilling, and planning.

Discussion

When using a machine tool to machine a metal workpiece with large specifications or large thickness, in order to ensure the overall integrity of the workpiece, it is often necessary to remove a large milling amount from the workpiece. The deformation caused by improper workpiece mounting can be substantially controlled by manual measures, but the deformation of the workpiece due to the uneven internal residual stress cannot be effectively controlled. Increase in the thickness of the workpiece results an increase in degree of uniformity of the internal residual stress, and thus an increase in degree of imbalance of internal residual stress during processing. The residual stress is continuously released and balanced with the milling, boring, drilling and planning processes, resulting in continuous deformation of the machined workpiece. Device and a method for reducing and homogenizing residual stress of a workpiece generated during machining are urgently needed for avoiding such distortion caused by the machining, thereby ensuring the accuracy of the processed workpiece.

SUMMARY

In view of this, a main object of the present disclosure is to provide a device and a method for reducing and homogenizing residual stress of a workpiece generated during machining, so as to reduce and homogenize residual stress in a workpiece during machining process where the workpiece is fixed, such as milling, boring, drilling and planning, preventing the continuous deformation of the machined workpiece due to the continuous release and balance of the residual stress in the workpiece, finally achieving and maintaining the design shape and accuracy of the workpiece.

The device for reducing and homogenizing residual stress of a workpiece generated during machining provided by the present disclosure comprises: a bench, which includes a bracket, a mounting part on the bottom thereof for mounting on a machine tool, a bench surface situated on the bracket and configured for supporting the workpiece to be machined, and a space situated below the bench surface, wherein the bench surface has a plurality of through holes; and a plurality of high-energy acoustic wave exciters situated in the space below the bench surface, each having an exciter body and an emitting end situated at one end of the exciter body, the emitting ends of the high-energy acoustic wave exciters being nested in the through holes on the bench surface.

In this way, the bench is fixed on the machine tool, the workpiece is fixed on the bench surface of the bench. When the workpiece is machined by the machine tool, the high-energy waves are emitted by the high-energy acoustic wave exciters nested in the through holes on the bench surface, and residual stress in the machined workpiece is reduced and homogenized through elastic wave energy generated in the workpiece by the high-energy waves. In this way, continuous deformation of the machined workpiece due to the continuous release and balance of the residual stress in the workpiece can be prevented, thereby achieving and maintaining the design shape and accuracy of the workpiece.

In some embodiments, a shape and curvature of the bench surface are adapted with a shape and curvature of the workpiece, so that the workpiece is tightly contacted with the high-energy acoustic wave exciters on the bench surface. The shape of the bench surface includes a square, a circle, or a triangle, and the curvature of the bench surface is a concave or convex surface adapted to the workpiece.

In this way, it ensures that when workpieces with different shapes and curvatures are machined, reduction and homogenization of the residual stress in the machined workpieces can be realized.

In some embodiments, the emitting ends of the high-energy acoustic wave exciters are arranged at a certain angle with respect to the exciter bodies.

In this way, the high-energy acoustic waves with different incident angles can be generated. It can not only generate the high-energy acoustic waves directly propagating into the workpiece, but also generate ultrasonic guided waves that propagate along the walls of the large thin-walled workpiece and fill the wall in the entire thickness direction.

In some embodiments, the high-energy acoustic wave exciters are arranged in an array, the array is a square array, a circular array or a triangular array.

In this way, the high-energy acoustic wave exciters are adjusted easily according to the residual stress distribution of the workpiece, thereby achieving a coordinated control for the high-energy acoustic wave exciters.

In some embodiments, a method for reducing and homogenizing residual stress in a workpiece generated during machining by using the above device includes the following steps:

fixing the bench on the machine tool;
fixing the workpiece to the bench after applying a coupling medium to the workpiece;
machining the workpiece by the machine tool and at the same time emitting high-energy acoustic waves into the workpiece by the high-energy acoustic wave exciters; and
removing the workpiece and wiping out the couple medium after machining.

In this way, the residual stress in the machined workpiece is reduced and homogenized by the elastic wave energy generated in the workpiece by the high-energy acoustic waves. In this way, continuous deformation of the machined workpiece due to the continuous release and balance of the residual stress in the workpiece can be prevented, thereby achieving and maintaining the design shape and accuracy of the workpiece.

In some embodiments, the high-energy acoustic waves comprises at least one of high-energy acoustic waves with low-frequency and high-energy, high-energy acoustic waves with high-frequency and low-energy, high-energy acoustic waves with a wide-range frequency band and wide-range energy, and high-energy acoustic waves in longitudinal wave, transverse wave, surface wave and guided wave models.

In this way, different high-energy acoustic waves can be generated according to the condition of the workpiece, and thus the residual stress in the workpieces with different shapes and thicknesses can be reduced and homogenized.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawing which.

DETAILED DESCRIPTION

Embodiments of a device of the present disclosure for reducing and homogenizing residual stress of a workpiece generated during machining will be described below with reference to the drawings.

As shown in FIGS. 1 to 4, a device for reducing and homogenizing residual stress of a workpiece generated during machining according to an embodiment of the present disclosure may include a mounting sleeve 100, a high-energy acoustic wave exciter 200 and a bench 300, wherein the high-energy acoustic wave exciter 200 is fixedly mounted on the bench 300.

Figure 1:
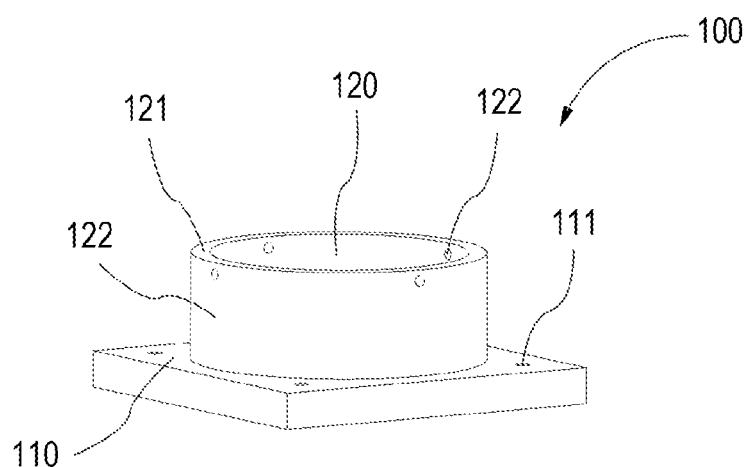
FIG. 1 is a schematic structural view of a mounting sleeve according to an embodiment.

The mounting sleeve 100 is shown in FIG. 1, which includes: a mounting socket 110 in a form of square, through holes 111 arranged respectively at four corners of the mounting socket 110 for bolt passage, and a hollow cylindrical sleeve 120 arranged in the center of the mounting socket 110 and protruding upward. The top of the sleeve 120 has a sleeve end surface 121, the side of the sleeve 120 is labeled as sleeve body 122, four fixing hole 122 oriented toward the axis of the sleeve 120 are arranged evenly on the sleeve body 122 at the same height.

Figure 2:
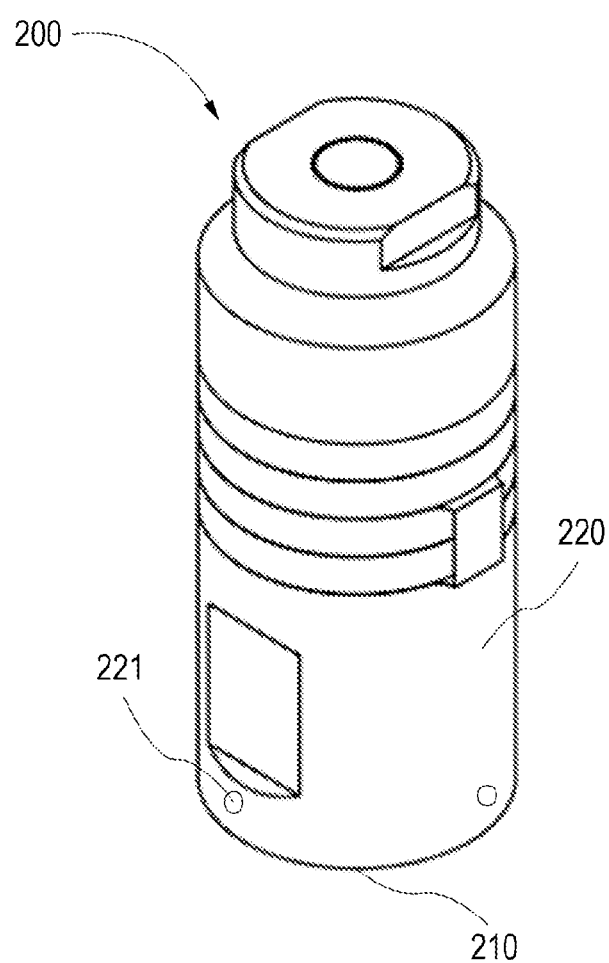
FIG. 2 is a schematic structural view of a high-energy acoustic wave exciter according to an embodiment.

The high-energy acoustic wave exciter 200 is shown in FIG. 2. In this case, the high-energy acoustic wave exciter 200 is in a form of cylinder as a whole. The lower end surface of the high-energy acoustic wave exciter 200 in the FIG. 2 is an emitting end 210, a part above the emitting end 210 of the high-energy acoustic wave exciter 200 is an exciter body 220, four thread holes 221 corresponding to the above fixing holes 122 are arranged on the exciter body 220 at a position closer to the emitting end 210.

Figure 3:
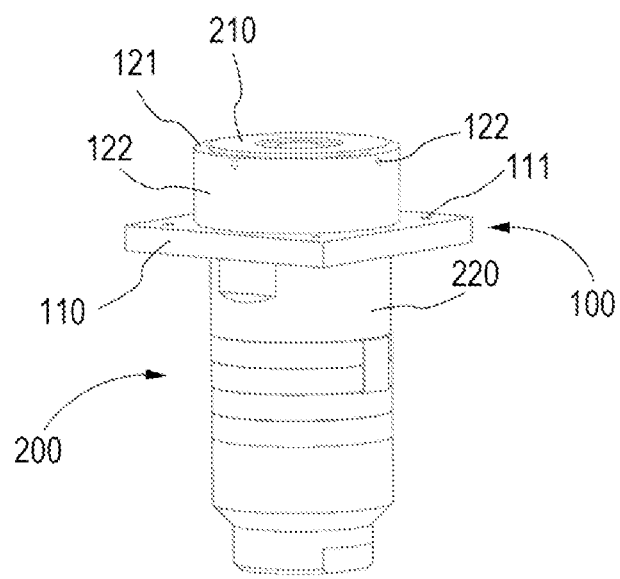
FIG. 3 is a schematic structural view of the high-energy acoustic wave exciter of FIGS. 1 and 2 nested in the mounting sleeve.
Figure 4A:
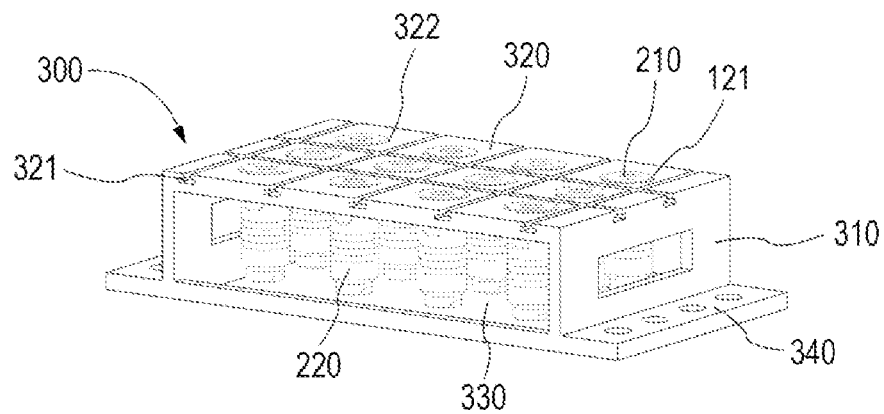
FIG. 4 is a schematic structural view of various forms of benches after complete mounting according to an embodiment.
Figure 4B:
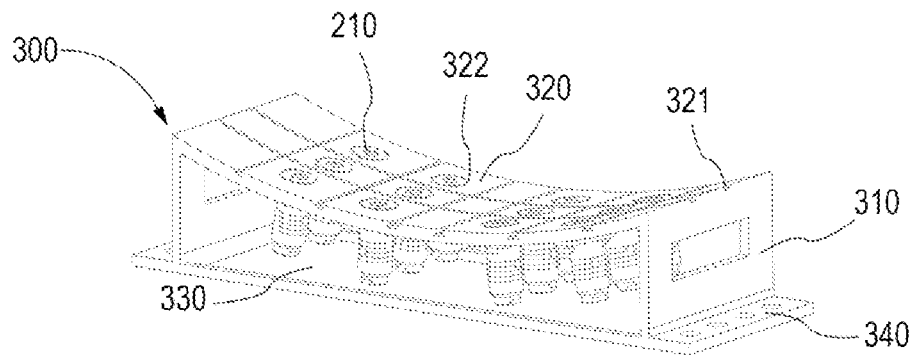
Figure 4C:
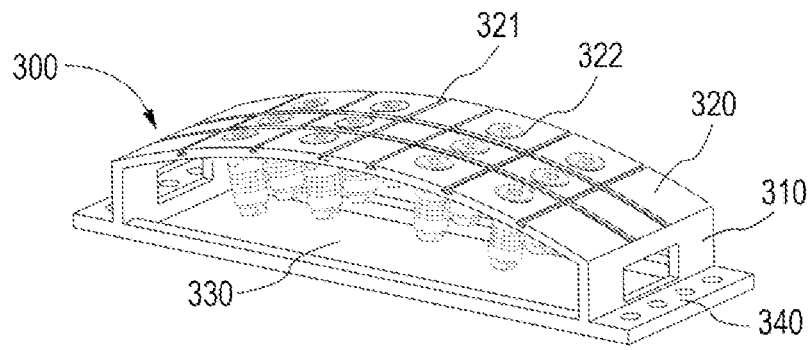
Figure 4D:
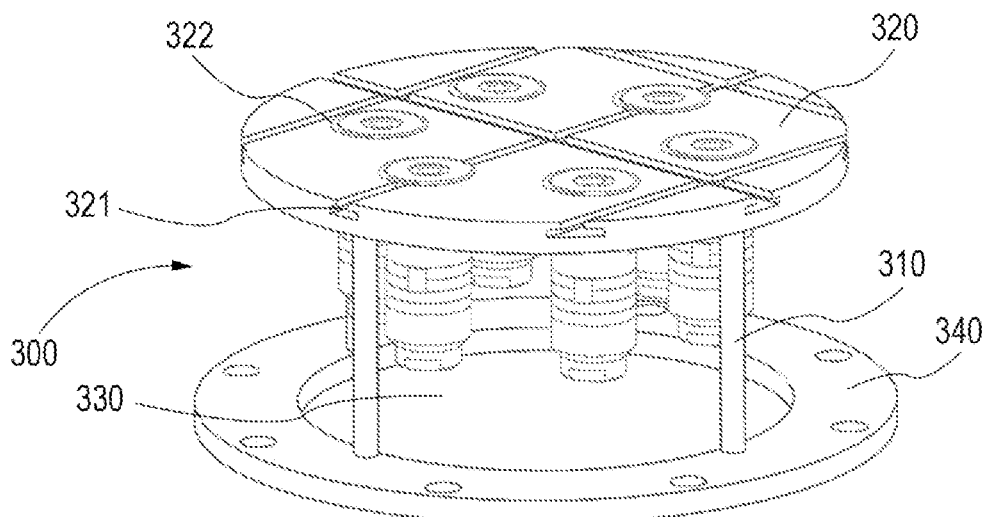
Figure 4E:
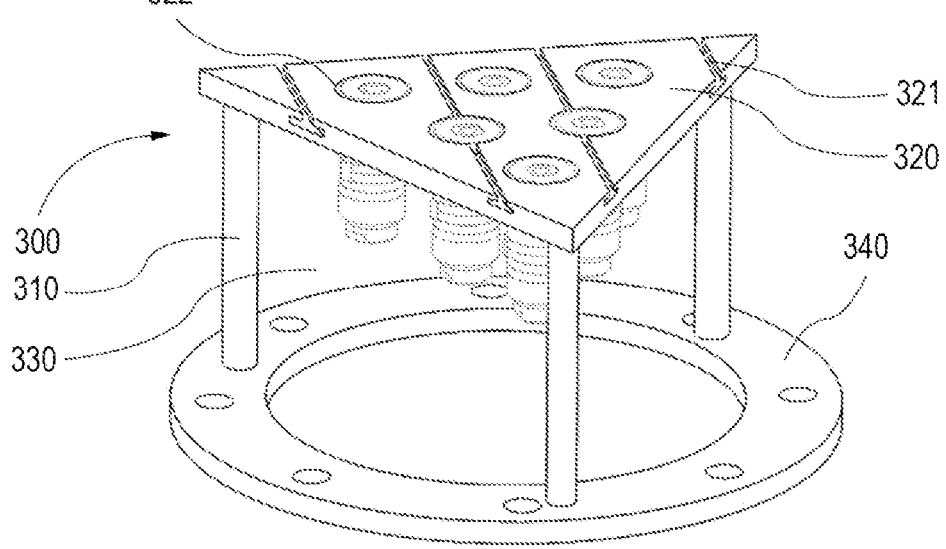

FIG. 3 shows a schematic diagram of the high-energy acoustic wave exciter 200 nested in the mounting sleeve 100. In this case, the emitting end 210 is slightly higher than the sleeve end surface 121, and the four fixing holes 122 correspond to the four threaded holes 221 so that they can be fixedly connected by bolts.

FIG. 4 is a schematic diagram of the bench 300 after mounting the high-energy acoustic wave exciters 200. In this case, the bench 300 may include a bracket 310 and a bench surface 320 on the bracket 310, and the region below the bench surface 320 further has a mounting space 330 for mounting the high-energy acoustic wave exciters 200. On the bench surface 320, a plurality of mounting holes 322 in an array for mounting the high-energy acoustic wave exciters 200 and a plurality of T-slots 321 arranged in parallel and configured for engaging fixing members are arranged in such a way that the positions of the mounting holes ensures that the engagement of the members is not affected by the high-energy acoustic wave exciters 200. The high-energy acoustic wave exciter is nested in the mounting sleeve 100, then the mounting sleeve 100 is fixedly connected to the bench surface 320 via bolts in such a way that the sleeve end surface 121 and the bench surface 320 coincide, so that the high-energy acoustic wave exciter 200 is fixed in the mounting holes 322. The bottom of the bracket 310 extends outward from both sides to form an engaging and fixing portion 340 through which the bench 300 is fixed on a machine tool.

In some embodiments, as shown in FIG. 4, the bench surface 320 may be rectangular, circular, or triangular, and may also be concave or convex. The arrangement of the mounting holes 322 may be a square array, a circular array or a triangular array. Meanwhile, the curvatures of the end surfaces of the emitting ends 210 the high-energy acoustic wave exciters 200 are consistent with the bench 300, respectively.

When in use, the appropriate bench 300 is selected according to the curvature and shape of the workpiece. The high-energy acoustic wave exciters 200 are fixedly mounted on the bench 300 according to the positions to be regulated. After being completely mounted with the exciters, the bench 300 is mounted in an appropriate location of the machine tool. After the coupling medium is evenly applied on the regulated part of the workpiece, the workpiece is stably placed on the bench surface 320 to ensure that the workpiece and the emitting ends 210 of the high-energy acoustic wave exciters 200 closely adhere to each other through the coupling medium. The workpiece is fixed by positioning and engaging devices mounted in the T-slots 321. A number of high-energy acoustic wave exciters 200 perform the excitation work in coordination and emit high-energy acoustic waves to the workpiece. Elastic wave energy generated in the workpiece caused by the high-energy acoustic waves reduces and homogenizes the residual stress inside the machined workpiece, reconstructing the equilibrium state of the residual stress distribution in the workpiece destroyed by the residual stress generated by machining such as milling. In this way, the purpose of reducing and homogenizing residual stress while machining is achieved, realizing a stress-free machining, thereby ensuring that the deformation amount of the workpiece during and after machining is minimized.

In some embodiments, the coupling medium may be a colloidal medium capable of transmitting sound waves, such as industrial grease, ultrasonic transverse and longitudinal wave coupling agents, honey and glycerin.

In some embodiments, the high-energy acoustic wave exciters 200 under thick walls or big parts of the workpiece should emit high-energy acoustic waves with low frequency and high energy, and the high-energy acoustic wave exciters

200 under thin walls or small part of the workpiece should emit high-energy acoustic waves with high frequency and low energy.

In some embodiments, the high-energy acoustic wave exciter 200 can generate high-energy acoustic waves with a wide range of frequency band and a wide range of energy.

In some embodiments, the high-energy acoustic wave exciter 200 can generate multi-modal high-energy acoustic waves such as longitudinal waves, transverse waves, surface waves and guided waves in the regulated workpiece to reduce and homogenized the residual stress inside different types of workpieces.

In some embodiments, the emitting end 210 and the exciter body 220 of the high-energy acoustic wave exciter 200 can be arranged at a certain angle, which can generate high-energy acoustic waves with different incident angles. It can not only generate high-energy acoustic waves directly propagating into the workpiece, but also generate ultrasonic guided waves that propagate along the walls of the large thin-walled workpiece and fill the wall in the entire thickness direction. Efficient reduction and homogenization of residual stress of the large thin-walled workpiece are thus realized.

In some embodiments, the T-slots 321 may also be threaded holes 221 or positioning holes through which the positioning and engaging members can be mounted.

In some embodiments, the high-energy acoustic wave exciter 200 is constituted by transducer element such as piezoelectric transducer element, magnetoacoustic transducer element, photoacoustic transducer element, mechanical impact transducer, and likes.

In some embodiments, it further includes a detection device, which monitors the change trend of residual stress in the workpiece by using ultrasonic non-destructive testing method to ensure that the residual stress in the machined workpiece is minimized and equilibrium state is reached without excessive regulation.

Figure 5:
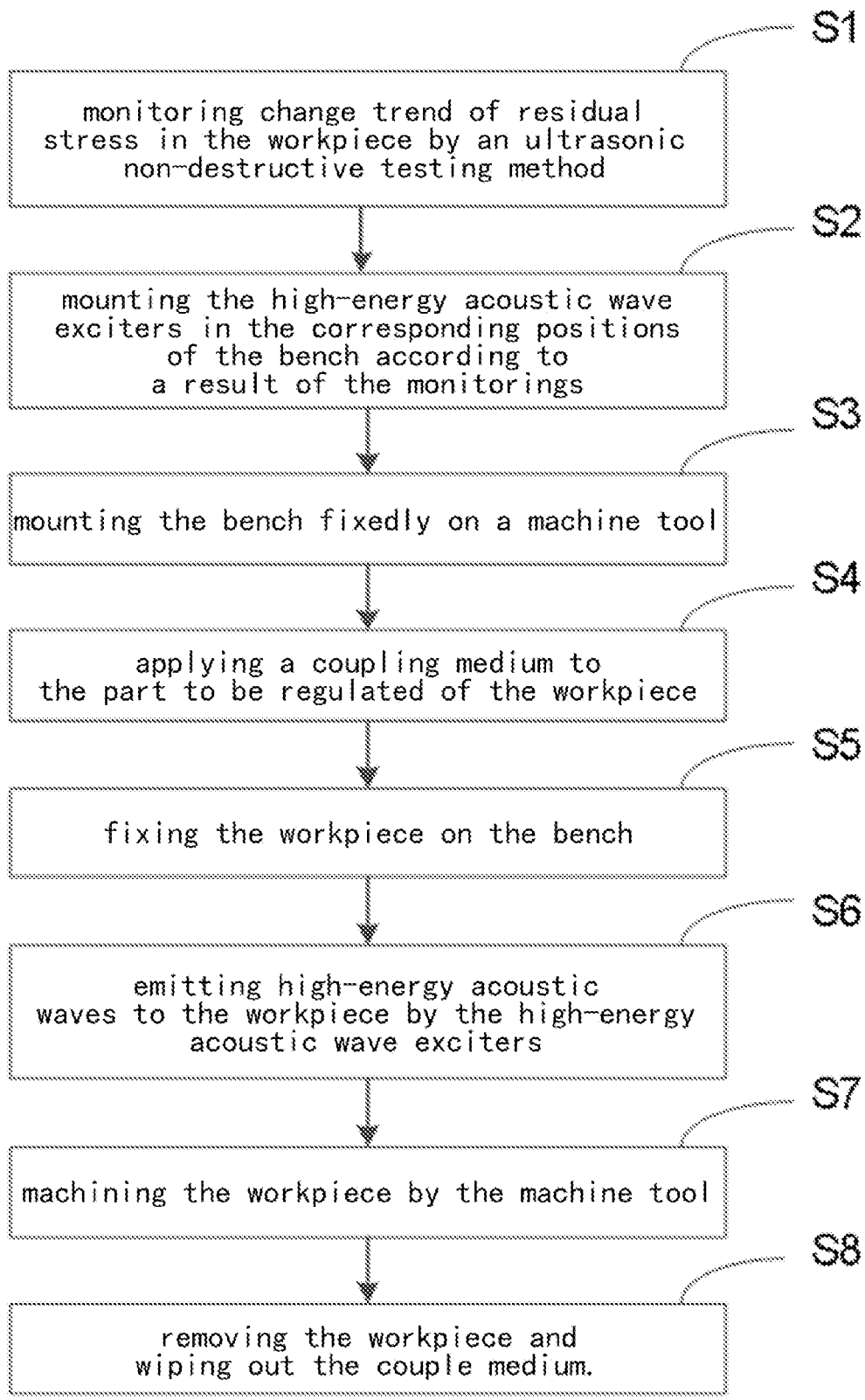
FIG. 5 is a flowchart of a method for reducing and homogenizing residual stress of a workpiece generated during machining based on the above device according to the embodiment.

As shown in FIG. 5, this embodiment also provides a method for reducing and homogenizing residual stress of a workpiece generated during machining based on the above device. The method may include the following steps:

S1, monitoring change trend of residual stress in the workpiece by an ultrasonic non-destructive testing method;

S2, mounting the high-energy acoustic wave exciters 200 in the corresponding positions of the bench 300 according to a result of the monitoring;

S3, mounting the bench 30 fixedly on the machine tool;

S4, applying a coupling medium to the part to be regulated of the workpiece;

S5, fixing the workpiece on the bench 300;

S6, emitting high-energy acoustic waves to the workpiece by the high-energy acoustic wave exciters 200;

S7, machining the workpiece by the machine tool; and

S8, removing the workpiece and wiping out the couple medium.

The above embodiment is only a preferred embodiment of the present disclosure and is not intended to limit the present disclosure. Any modification, equivalent replacement, improvement, and likes made within the spirit and principle of the present disclosure should be included in within the scope of protection of the present disclosure.

What is claimed is:

1. A device for reducing and homogenizing residual stress in a workpiece generated during machining, comprising:
    a bench, which includes a bracket, a mounting part on the bottom thereof for mounting on a machine tool, a bench surface situated on the bracket and configured for supporting the workpiece to be machined, and a space situated below the bench surface, wherein the bench surface has a plurality of through holes; and
    a plurality of high-energy acoustic wave exciters situated in the space below the bench surface and being configured for emitting, when the workpiece is machined by the machine tool, high-energy acoustic waves into the workpiece to reduce and homogenize residual stress in the workpiece by elastic wave energy generated in the workpiece by the high-energy acoustic waves, each having an exciter body and an emitting end situated at one end of the exciter body, wherein the emitting ends of the high-energy acoustic wave exciters are nested in the through holes on the bench surface.

2. The device for reducing and homogenizing residual stress of a workpiece generated during machining as claimed in claim 1, wherein, a shape and curvature of the bench surface are adapted with a shape and curvature of the workpiece.

3. The device for reducing and homogenizing residual stress of a workpiece generated during machining as claimed in claim 2, wherein, the shape of the bench surface includes a square, a circle, or a triangle, and the curvature of the bench surface is a concave or convex surface adapted to the workpiece.

4. The device for reducing and homogenizing residual stress of a workpiece generated during machining as claimed in claim 1, wherein, the emitting ends of the high-energy acoustic wave exciters are arranged at a certain angle with respect to the exciter bodies.

5. The device for reducing and homogenizing residual stress of a workpiece generated during machining as claimed in claim 1, wherein, the high-energy acoustic wave exciters are arranged in an array.

6. The device for reducing and homogenizing residual stress of a workpiece generated during machining as claimed in claim 5, wherein, the array is a square array, a circular array or a triangular array.

7. The device for reducing and homogenizing residual stress of a workpiece generated during machining as claimed in claim 1, wherein, T-slots, thread holes or positioning holes for fixing the workpiece are further provided on the bench surface.

8. A method for reducing and homogenizing residual stress in a workpiece generated during machining by using the device as claimed in claim 1, comprising the following steps:
    fixing the bench on a machine tool;
    fixing the workpiece to the bench after applying a coupling medium to the workpiece;
    machining the workpiece by the machine tool and at the same time emitting high-energy acoustic waves into the workpiece by the high-energy acoustic wave exciters to reduce and homogenize residual stress in the workpiece by elastic wave energy generated in the workpiece by the high-energy acoustic waves; and
    removing the workpiece and wiping out the coupling medium after the machining is completed.

9. The method for reducing and homogenizing residual stress in a workpiece generated during machining as claimed in claim 8, wherein, the high-energy acoustic waves comprises at least one of high-energy acoustic waves with low-frequency and high-energy, high-energy acoustic waves with high-frequency and low-energy, high-energy acoustic waves with a wide-range frequency band and wide-range energy, and high-energy acoustic waves in longitudinal wave, transverse wave, surface wave and guided wave models.

10. The method for reducing and homogenizing residual stress in a workpiece generated during machining as claimed in claim 8, wherein, the coupling medium is a colloidal medium capable of transmitting sound waves.

* * * * *